(12) United States Patent
Feng

(10) Patent No.: US 7,990,640 B2
(45) Date of Patent: Aug. 2, 2011

(54) APPARATUS AND METHOD FOR DETERMINING MOTOR SPIN DIRECTION OF A HARD DISK DRIVE

(75) Inventor: Xiangyang Feng, Singapore (SG)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 1105 days.

(21) Appl. No.: 11/643,184

(22) Filed: Dec. 20, 2006

(65) Prior Publication Data

US 2008/0151403 A1  Jun. 26, 2008

(51) Int. Cl.
*G11B 27/36* (2006.01)
(52) U.S. Cl. .......................................................... 360/31
(58) Field of Classification Search .................. None
See application file for complete search history.

(56) References Cited

U.S. PATENT DOCUMENTS

| | | | |
|---|---|---|---|
| 5,216,662 A * | 6/1993 | Stefansky et al. ............. | 720/673 |
| 5,258,695 A | 11/1993 | Utenick et al. | |
| 5,333,140 A * | 7/1994 | Moraru et al. ................ | 714/719 |
| 5,623,379 A | 4/1997 | Nishimura et al. | |
| 6,058,335 A * | 5/2000 | Kim ............................. | 700/108 |
| 6,210,119 B1 | 4/2001 | Lifson et al. | |
| 6,369,534 B1 | 4/2002 | Menegoli | |
| 6,724,577 B2 * | 4/2004 | Ishii et al. ................... | 360/256.1 |
| 6,785,082 B2 * | 8/2004 | Fiorvanti et al. ............. | 360/75 |
| 6,844,996 B1 * | 1/2005 | Berding et al. ............. | 360/97.01 |
| 7,633,708 B2 * | 12/2009 | Hendriks ................... | 360/97.02 |
| 7,660,071 B1 * | 2/2010 | Riener et al. ............... | 360/97.01 |
| 2004/0070388 A1 | 4/2004 | Chuang et al. | |
| 2007/0188914 A1 * | 8/2007 | Gross ......................... | 360/97.02 |

FOREIGN PATENT DOCUMENTS

| | | |
|---|---|---|
| JP | 1258213 | 10/1989 |
| JP | 4112649 | 4/1992 |
| JP | 7218059 | 8/1995 |
| JP | 9327195 | 12/1997 |
| JP | 2000050675 | 2/2000 |
| JP | 2003199296 | 7/2003 |
| JP | 2004101067 | 4/2004 |
| JP | 2004251755 | 9/2004 |

OTHER PUBLICATIONS

Deleo, et al., "Improving Stiction Performance by Purging HDAs", *IBM Techinical Disclosure Bulletin*, vol. 38 Pub No. 12, (Dec. 1995),491-492.

* cited by examiner

*Primary Examiner* — K. Wong

(57) ABSTRACT

A method for determining motor spin direction of a hard disk drive is provided. The method includes forming an air inlet on a first sidewall of a disk drive base. The method further includes forming an air outlet on a second sidewall of the disk drive base wherein the air outlet comprises an airflow indicator coupled to the air outlet for indicating whether air is moving in or out of the air outlet. The method further includes rotating a disk drive motor inside the disk drive and determining the motor spin direction of the disk drive motor based on whether the air is moving in or out of the air outlet.

20 Claims, 4 Drawing Sheets

400

Forming an air inlet on a first sidewall of a disk drive base.
402

Forming an air outlet on a second sidewall of the disk drive base, the air outlet comprising an airflow indicator coupled to the air outlet for indicating whether air is moving in or out of the air outlet.
404

Rotating a disk drive motor inside the disk drive.
406

Determining the motor spin direction of the disk drive motor based on whether the air is moving in or out of the air outlet.
408

FIG. 4

APPARATUS AND METHOD FOR DETERMINING MOTOR SPIN DIRECTION OF A HARD DISK DRIVE

TECHNICAL FIELD

The present invention relates to the field of hard disk drives, and more particularly to an apparatus and method for determining motor spin direction in a hard disk drive.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm or slider is utilized to reach out over the disk. The arm has a magnetic read/write transducer or head for reading/writing information to or from a location on the disk. The complete assembly, e.g., the arm and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modem hard disk drives are much smaller and include disk diameters of less than 2.5 inches (micro drives are significantly smaller than that). Advances in magnetic recording are also primary reasons for the reduction in size.

The increased size reduction has introduced many problems associated with the manufacture of hard disk drives.

SUMMARY

A method for determining motor spin direction of a hard disk drive is provided. The method includes forming an air inlet on a first sidewall of a disk drive base. The method further includes forming an air outlet on a second sidewall of the disk drive base wherein the air outlet comprises an airflow indicator coupled to the air outlet for indicating whether air is moving in or out of the air outlet. The method further includes rotating a disk drive motor inside the disk drive and determining the motor spin direction of the disk drive motor based on whether the air is moving in or out of the air outlet.

BRIEF DESCRIPTION OF THE DRAWINGS

FIG. 4 is a flow diagram of an exemplary method for determining motor spin direction in a hard disk drive in accordance with embodiments of the present invention.

BEST MODES FOR CARRYING OUT THE INVENTION

Reference will now be made in detail to the alternative embodiment(s) of the present invention, an apparatus and method for determining motor spin direction in a hard disk drive. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
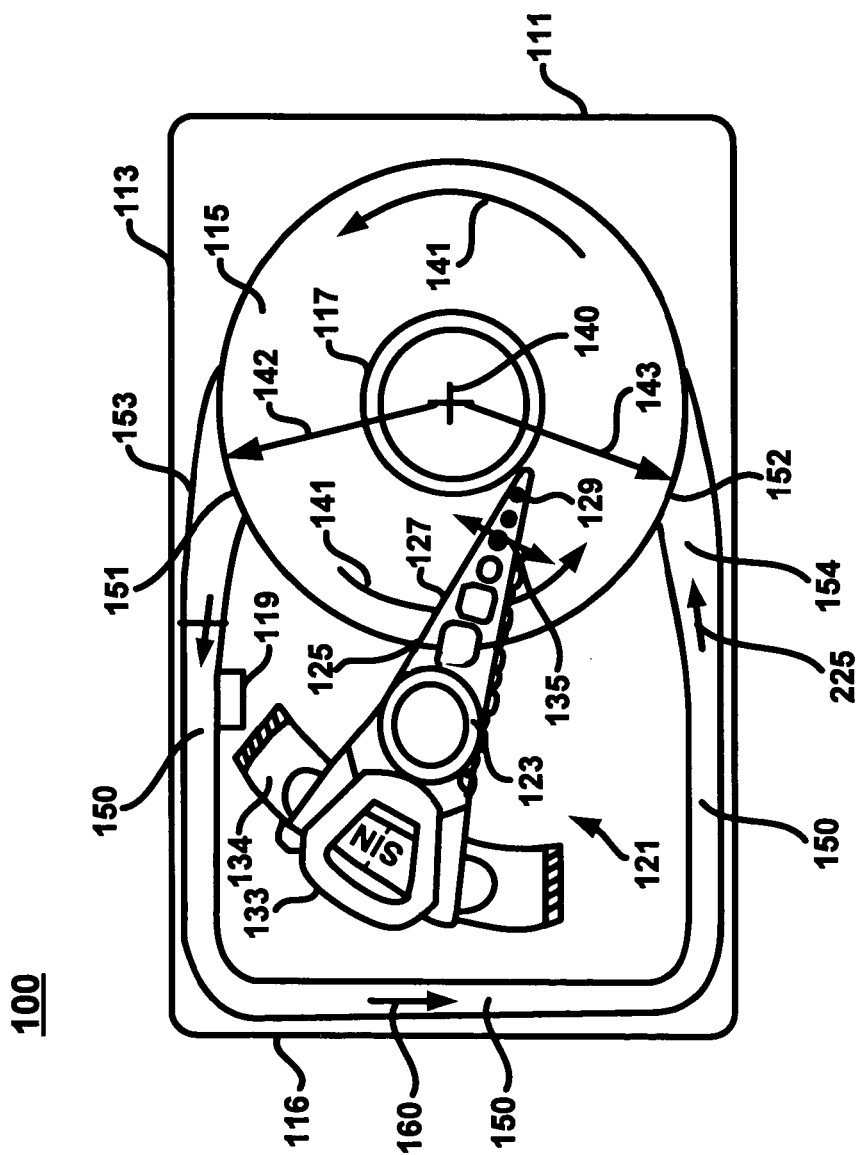
FIG. 1 is a schematic, top plan view of a hard disk drive in accordance with one embodiment of the present invention.

With reference now to FIG. 1, a schematic drawing of one embodiment of an information storage system 100 comprising a magnetic hard disk file or drive 111 for a computer system is shown. Drive 111 has an outer housing or base 113 containing a disk pack having at least one media or magnetic disk 115. The disk or disks 115 are rotated (see arrows 141) by a spindle motor assembly having a central drive hub 117. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly (HGA) is head and the slider 129, which are mounted on suspension 127. The slider 129 is usually bonded to the end of suspension 127. The head is typically pico size (approximately 1160×1000×300 microns) and formed from ceramic or intermetallic materials. The head also may be of "femto" size (approximately 850×700×230 microns) and is pre-loaded against the surface of disk 115 (in the range two to ten grams) by suspension 127.

Suspensions 127 have a spring-like quality, which biases or urges the air-bearing surface of the slider 129 against the disk 115 to cause the slider 129 to fly at a precise distance from the disk. A voice coil 133 free to move within a conventional voice coil motor magnet assembly 134 (top pole not shown) is also mounted to arms 125 opposite the head gimbal assemblies. Movement of the actuator 121 (indicated by arrow 135)

by controller 119 moves the head gimbal assemblies along radial arcs across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Referring still to FIG. 1, the disk pack and disks 115 (one shown) define an axis 140 of rotation 141 and radial directions 142, 143, relative to the axis 140. The drive 111 also has a bypass channel 150 formed in the housing 113 for directing the airflow 160 generated by rotation of the disks 115 from the upstream side of the disk pack or disks (e.g., proximate to radial direction 142 in FIG. 1) 115 to the downstream side of the disk pack or disks 115 (e.g., proximate to radial direction 143 in FIG. 1).

In one embodiment the drive 111 also comprises a diffuser 221. In the embodiment shown, the diffuser 221 is located in the bypass channel 219 and is positioned adjacent to the downstream side 213 of the disk pack or disks 115. The diffuser 221 is also offset downstream from the disks 115 in the radial direction 207, such that the diffuser 221 reduces airflow drag from the disks 115 due to disk wake in the bypass channel 219. This type of aerodynamic drag is commonly called base drag.

In the embodiment shown, the bypass channel 150 is located between an outer perimeter 116 of the housing 113 and the actuator 121, such that the bypass channel 150 completely circumscribes the actuator 121. Bypass channel 150 further comprises a first opening 151 proximate to upstream side wherein air is conveyed away from the disks 115 and a second opening 152 proximate to downstream side wherein airflow 160 is directed toward the disks 115.

As shown in FIG. 1, one embodiment of the drive 111 bypass channel 150 constructed in accordance with the present invention also comprises a diffuser 153. In the embodiment shown, the diffuser 153 is located in the bypass channel 150 and is positioned adjacent to the upstream side of the disk pack or disks 115. The diffuser 153 is also offset upstream from the disks 115 in the radial direction 142, such that the diffuser 153 reduces airflow drag from the disks 115 due to disk wake in the bypass channel 150. This type of aerodynamic drag is commonly called base drag. In embodiments of the present invention, bypass channel 150 exhibits low flow resistance to airflow 160.

Alternatively, or operating in conjunction with the diffuser 153, another embodiment of the drive 111 may include a contraction 154 (e.g., a Venturi). The contraction 154 is also located in the bypass channel 150, but is adjacent to the downstream side of the disk pack or disks 115. Like the diffuser 153, the contraction 154 is typically offset downstream from the disks 115, but in a radial direction 143. Each of the diffuser 153 and the contraction 154 may be spaced apart from the outer edges of the disks 115 in radial directions 142, 143 by, for example, approximately 0.5 mm. The contraction 154 may be provided for re-accelerating bypass airflow 160 to provide efficient energy conversion for the air flow from pressure energy to kinetic energy prior to merging bypass airflow 160 with air flow 141 around the disks 115.

The use of bypass channel 150 has several advantages, including the ability to reduce aerodynamic buffeting of actuator 121 during the servo writing process and/or during normal operation of disk drive system 111. More specifically, bypass channel 150 reduces the pressure build-up on the upstream side of actuator 121 which occurs when drive 111 is operated. Additionally, directing airflow 160 around the actuator 121 decreases the upstream pressure on the actuator, thus reducing force acting on the actuator 121 while reducing the energy of the bluff-body wake of the actuator arm.

In embodiments of the present invention, disk drive system 111 may be filled with a gas (e.g., helium) rather than ambient air. This may be advantageous in that helium is a lighter gas than ambient air and causes less buffeting of actuator 121 when disk drive system 111 is in operation. In embodiments of the present invention, disk drive 111 may be sealed after the servo writing process to keep the helium in the drive. Alternatively, the helium may be removed from disk drive 111 and ambient air is allowed to return into the disk drive prior to sealing first opening 151 and second opening 152.

Hard Disk Drive as an Air Pump To Determine Motor Spin Direction

Embodiments of the present invention can be used to determine the spin direction of a hard disk drive. It is appreciated that embodiments of the present invention can be implemented and used during the set-up and calibration of hard disk drive manufacturing equipment.

For example, in some disk drive designs, the motor used to spin the disk pack does not include a sensor that indicates which direction the motor is turning. With this particular design, it is very difficult to determine if the motor was wired correctly during manufacture.

Many disk drive motors are three phase motors with three wires supplying power to the motor. If one or more of the wires are incorrectly coupled to the motor (e.g., during assembly), the motor may operate in the opposite direction from the designed direction, making the final product inoperable.

Embodiments of the present invention can be used during set up of disk drive manufacture equipment to test correct set-op and assembly of the disk drive. For example, embodiments of the present invention can be used to determine whether a disk drive motor assembler is set-up to properly wire disk drive motors. In one embodiment of the invention, a test drive is used in a manufacturing device to test if the device is correctly assembling the disk drives.

Embodiments of the present invention utilize the airflow characteristics of a disk drive to determine the direction of rotation of the disk drive motor. In one embodiment of the invention, the disk drive is essentially formed into an air pump. An air inlet and outlet are formed in the disk drive base and depending on the airflow at each of the ports, the direction of rotation can be determined. For example, if air is flowing out of the outlet, it can be determined that the motor is rotating in the correct direction and if air is flowing in the outlet, it can be determined that the motor is rotating in the incorrect direction, indicating the motor is wired incorrectly.

In one embodiment of the invention, an airflow indicator is located on the outlet to help indicate which direction the air is flowing with respect to the outlet. It is appreciated that the airflow indicator could be any kind or type of indicator in accordance with embodiments of the invention. For example, the airflow indicator could be a simple mechanical indicator, such as a lightweight material disposed close to the port. If the material is blown away from the outlet, it can be easily determined that air is flowing out of the outlet. If the lightweight material is sucked into the outlet, it can be determined that air is being sucked into the air outlet, indicating incorrect operation. The airflow indicator could also be more complex, such as an electrical airflow meter that measures the amount of airflow going either in or out of the outlet port, for example.

Figure 2:
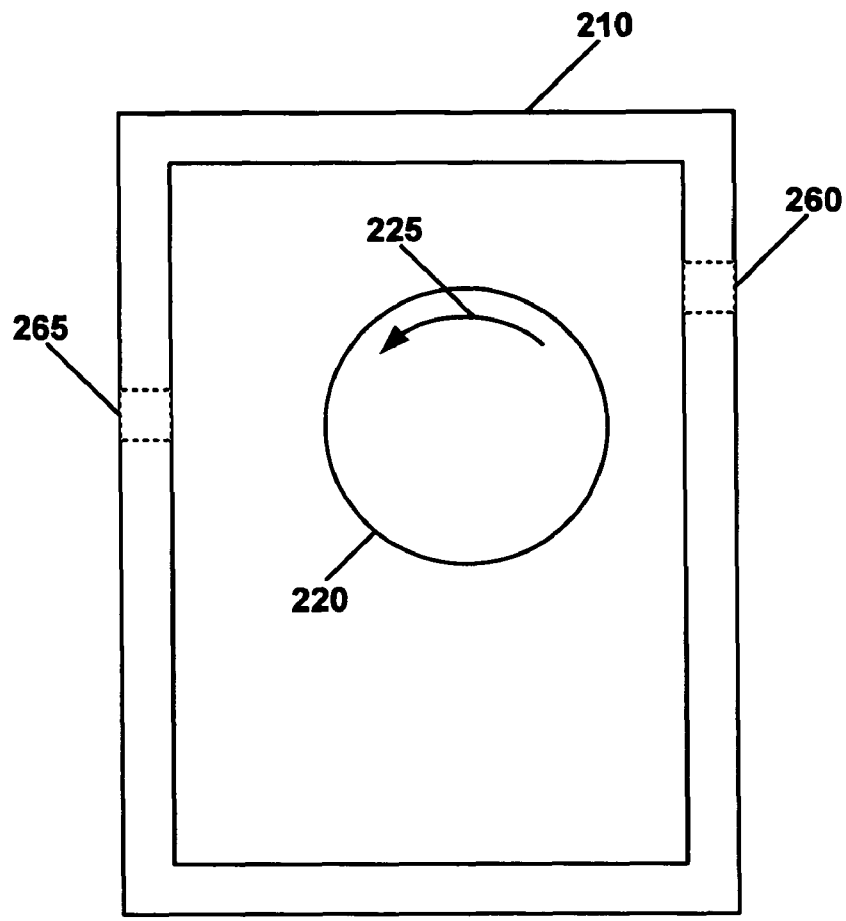
FIG. 2 is a diagram of an exemplary disk drive including an air inlet and air outlet for determining motor spin direction in accordance with embodiments of the present invention.

FIG. 2 is a diagram 200 of an exemplary disk drive including an air inlet 260 and air outlet 265 for determining motor spin direction 225 in accordance with embodiments of the present invention. As stated above, the disk drive housing (e.g., base) 210 includes an air inlet 260 and an air outlet 265 that can be used to determine the direction of rotation 225 of a hard disk drive motor. In one embodiment of the invention, when the disk drive motor is operating in the designed direction, air flows into the disk drive housing 210 through the air inlet 260 and exits the disk drive housing (e.g., base) 210 through the air outlet 265.

In one embodiment of the invention, the air inlet and air outlet are located on sidewalls of the disk drive housing 210. In one embodiment of the invention, the air inlet 260 and air outlet 265 are located on opposite sidewalls. However, it is appreciated that the air inlet 260 and air outlet 265 could be located anywhere on the disk drive housing 210 in accordance with embodiments of the present invention. In one embodiment of the invention, the air inlet 260 is disposed proximate a low pressure area of the disk drive housing 210 and the air outlet 265 is disposed proximate a high pressure area of the disk drive housing. It is appreciated that airflow characteristics may be different across hard disk drive designs and that the air inlet 260 and air outlet 265 may reside in different locations for different hard disk drive designs.

Figure 3:
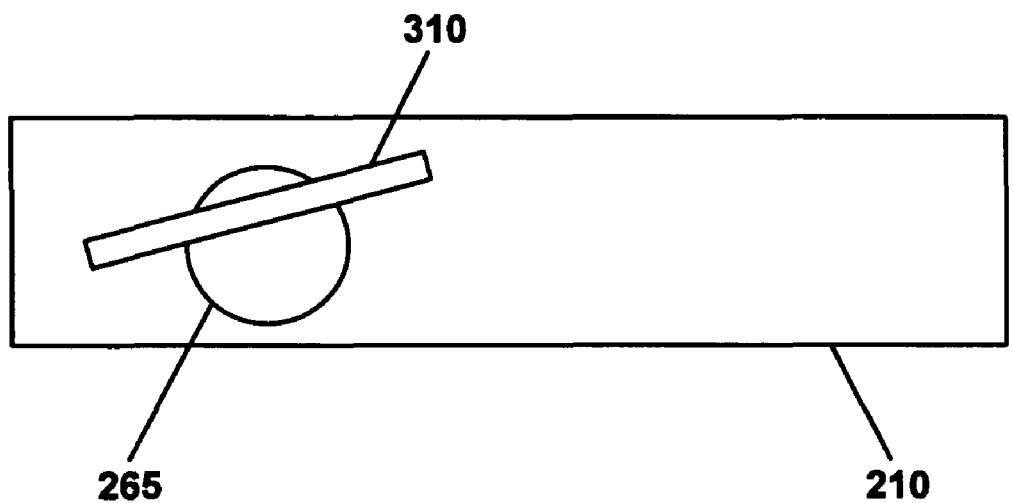
FIG. 3 is an illustration of a side view of an exemplary disk drive including an air outlet and airflow indicator for determining motor spin direction in accordance with embodiments of the present invention.

FIG. 3 is an illustration of a side view of an exemplary disk drive including an air outlet 265 and airflow indicator 310 for determining motor spin direction in accordance with embodiments of the present invention.

As stated above, embodiments of the present invention can be used to determine the direction of rotation of a hard disk drive motor based on airflow in and out of a hard disk drive housing. In one embodiment of the invention, when air is flowing out of the disk drive housing 210 from the air outlet 265, the disk drive motor is operating in the correct direction. If air is flowing into the disk drive housing 210 from the air outlet, the disk drive motor is operating in the incorrect direction. In one embodiment of the invention, an airflow indicator 310 is coupled to the sidewall of the disk drive housing 210 proximate the air outlet 265.

In one embodiment of the invention, the airflow indicator is a lightweight material that will move according to the airflow associated with the air outlet 265. For example, the airflow indicator may have properties similar a human hair. In this embodiment of the invention, the airflow indicator 310 will be sucked into the air outlet 265 in the case the motor is rotating in the incorrect direction. If the airflow indicator is blown away from the air outlet 265, the hard drive motor is rotating in the correct direction.

As stated above, it is appreciated that any lightweight material can be used in accordance with embodiments of the present invention to indicate airflow direction. It is also appreciated that many different systems and/or methods can be used to determine airflow in accordance with embodiments of the present invention. For example, an electronic airflow meter could be used to determine airflow in accordance with embodiments of the present invention.

It is also appreciated that embodiments of the present invention can be used for the set-up of hard disk drive manufacture equipment. For example, a test hard disk drive could be used (e.g., with an air inlet, air outlet and airflow indicator) to determine if a piece of machinery is properly set up. Embodiments of the present invention can be used to identify manufacturing errors on test drives instead of discovering the errors in production drives.

FIG. 4 is a flow diagram of an exemplary method 400 for determining motor spin direction in a hard disk drive in accordance with embodiments of the present invention.

At step 402, method 400 includes forming an air inlet on a first sidewall of a disk drive base. In one embodiment of the invention, the air inlet is located on the sidewall closest to the load/unload ramp of the hard disk drive. In another embodiment of the invention, the air inlet is located proximate a low pressure region of the hard disk drive.

At step 404, method 400 includes forming an air outlet on a second sidewall of the disk drive base wherein the air outlet comprises an airflow indicator coupled to the air outlet for indicating whether air is moving in or out of the air outlet. In one embodiment of the invention, the air outlet is located on a sidewall that is opposite the sidewall the air inlet is located. In one embodiment of the invention, the air outlet is located on the sidewall closest to the voice coil motor of the disk drive. In another embodiment of the invention, the air outlet is located proximate an area of high pressure inside the disk drive housing.

At step 406, method 400 includes rotating a disk drive motor inside the disk drive. In one embodiment of the invention, the disk drive motor is rotated by a disk drive test device.

At step 408, method 400 includes determining the motor spin direction of the disk drive motor based on whether the air is moving in or out of the air outlet. As stated above, in one embodiment of the invention, when air is flowing out of the air outlet, it is determined the disk drive motor is rotating in the correct direction and when air is flowing into the disk drive housing through the air outlet, it can be determined that the disk drive motor is rotating in the incorrect direction.

In one embodiment of the invention, method 400 further includes intermittently blocking the air inlet. By temporarily blocking the air inlet, the activity of the airflow indicator may be more easily determined. Intermittent blocking of the air inlet may cause pulsation of the airflow indicator which may make it easier to evaluate the airflow at the air outlet.

The alternative embodiment(s) of the present invention, a method and system for determining motor spin direction in a hard disk drive, is thus described. While the present invention has been described in particular embodiments, it should be appreciated that the present invention should not be construed as limited by such embodiments, but rather construed according to the below claims.

What is claimed is:

1. A method for determining motor spin direction of a hard disk drive comprising:
   forming an air inlet on a first sidewall of a disk drive base;
   forming an air outlet on a second sidewall of said disk drive base, said air outlet comprising an airflow indicator coupled to said air outlet for indicating which direction the air is flowing with respect to said air outlet;
   rotating a disk drive motor inside said disk drive; and
   determining said motor spin direction of said disk drive motor based on said airflow indicator.

2. The method as described in claim 1 wherein said airflow indicator comprises a length of light weight material wherein a first end of said lightweight material is coupled to said second sidewall proximate said air outlet.

3. The method as described in claim 2 wherein a second end of said lightweight material is free to enter or exit said air outlet based on said motor spin direction.

4. The method as described in claim 1 wherein said disk drive motor is rotated during testing of said hard disk drive.

5. The method as described in claim 1 further comprising:
   testing functionality of a hard disk drive manufacturing device based on said motor spin direction.

6. The method as described in claim 1 further comprising:
   intermittently blocking said air inlet to pause activity of said airflow indicator.

7. The method as described in claim 1 wherein said first sidewall is opposite said second sidewall.

8. A system for determining motor spin direction of a hard disk drive comprising:
   an air inlet on a first sidewall of a disk drive base;
   an air outlet on a second sidewall of said disk drive base;
   an airflow indicator coupled to said air outlet for indicating which direction the air is flowing with respect to said air outlet; and
   a disk drive motor located inside said disk drive, wherein said motor spin direction can be determined based on said airflow indicator.

9. The system as described in claim 8 wherein said airflow indicator comprises a length of light weight material wherein a first end of said lightweight material is coupled to said second sidewall proximate said air outlet.

10. The system as described in claim 9 wherein a second end of said lightweight material is free to enter or exit said air outlet based on said motor spin direction.

11. The system as described in claim 8 wherein said disk drive motor is rotated during manufacturing to determine said motor spin direction.

12. The system as described in claim 8 wherein said airflow indicator is an electrical airflow indicator.

13. The system as described in claim 8 further comprising an air inlet block for intermittently blocking said air inlet to pause activity of said airflow indicator.

14. The system as described in claim 8 wherein said first sidewall is opposite said second sidewall.

15. A hard disk drive comprising:
   a housing;
   a disk pack mounted to the housing and having a plurality of disks that are rotatable relative to the housing, the disk pack defining an axis of rotation and a radial direction relative to the axis;
   an actuator mounted to the housing and being movable relative to the disk pack, the actuator having a plurality of heads for reading data from and writing data to the disks;
   an air inlet on a first sidewall of said housing;
   an air outlet on a second sidewall of said housing;
   an airflow indicator coupled to said air outlet for indicating which direction the air is flowing with respect to said air outlet; and
   a disk drive motor coupled to said disk pack, wherein motor spin direction can be determined based on said airflow indicator.

16. The hard disk drive as described in claim 15 wherein said airflow indicator comprises a length of light weight material wherein a first end of said lightweight material is coupled to said second sidewall proximate said air outlet.

17. The hard disk drive as described in claim 16 wherein a second end of said lightweight material is free to enter or exit said air outlet based on said motor spin direction.

18. The hard disk drive as described in claim 15 wherein said disk drive motor is rotated during manufacturing to determine said motor spin direction.

19. The hard disk drive as described in claim 15 further comprising an air inlet block for intermittently blocking said air inlet to pause activity of said airflow indicator.

20. The hard disk drive as described in claim 15 wherein said first sidewall is opposite said second sidewall.

* * * * *